Patented Apr. 20, 1954

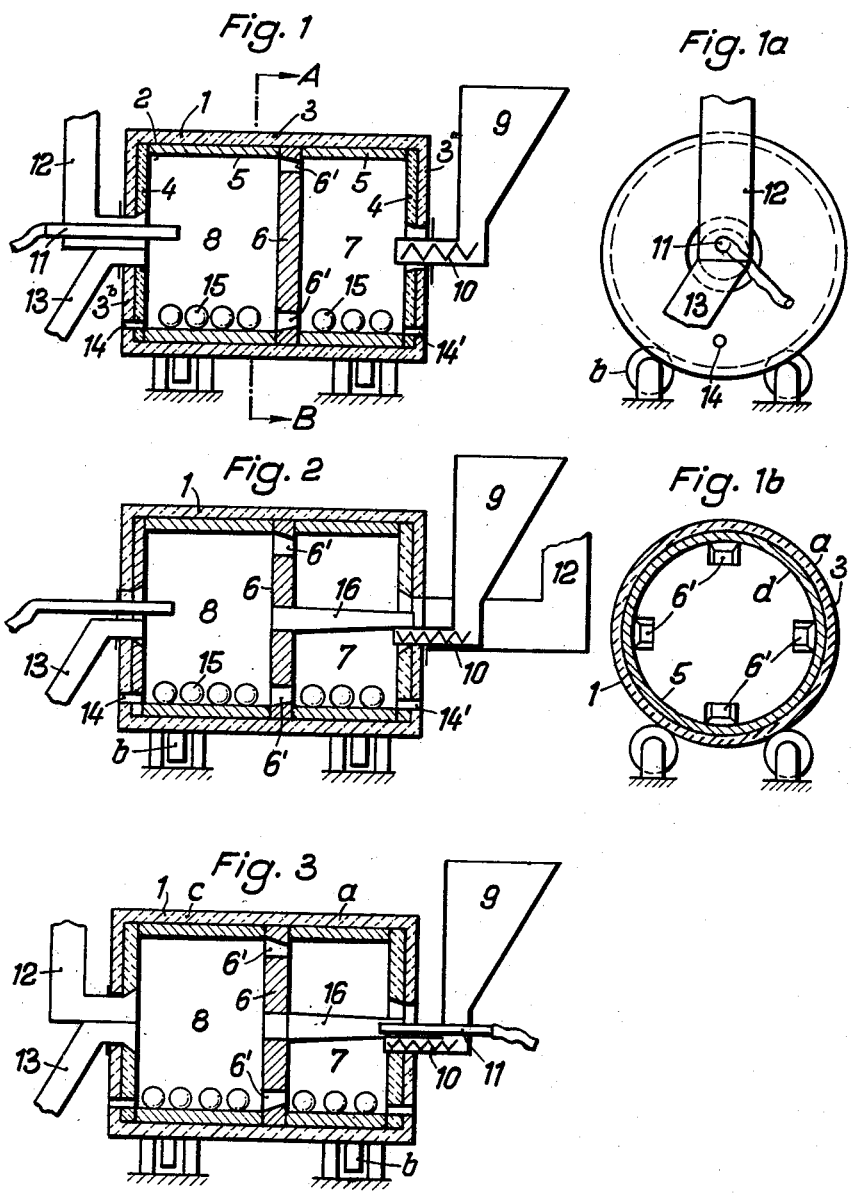

2,676,010

UNITED STATES PATENT OFFICE 2,676,010

APPARATUS FOR THE MELT-RECOVERY OF ZINC

Hermann Matthies, Woltorf, near Peine, Germany, assignor to Unterharzer Berg- und Huettenwerke G. m. b. H., Goslar, Germany Application May 29, 1951, Serial No. 228,796

Claims priority, application Germany November 15, 1950

2 Claims. (Cl. 266—33)

The invention relates to an apparatus for the melt-recovery of zinc from intermediary and waste products and it relates particularly to an apparatus for use in a process whereby the zinc containing products are immediately upon their generation and in the still hot state charged into a drum furnace which is heated to a temperature above the melting point of the zinc and preferably to about 700 to 800° C.

It is the main object of the invention to provide means for the continuous operation of the drum furnace, for a maximum recovery of the zinc from the charged materials and for an improved economy of the furnace operation.

With these objects in view, the apparatus forming the subject matter of this invention will now be described more in detail and with reference to the accompanying drawing.

In the drawing,

Fig. 1 is a longitudinal vertical sectional view of the furnace;

Fig. 1a is a left-end view of the same;

Fig. 1b is a vertical sectional view on line A—B of Fig. 1;

Figs. 2 and 3 are longitudinal sectional views similar to that of Fig. 1 of two further embodiments of the invention.

As apparent from Fig. 1, the furnace 2 consists of a closed cylindrical drum 3 made of a heat-insulating material. The lateral or furnace end walls are covered by an inner layer of a refractory material 4 whereas the cylindrical furnace portion is provided with an inner layer 5 of a good heat conductor, such as silicon carbide.

A vertical center wall 6, also made of silicon carbide, divides the inner space of the drum furnace in two chambers 7, 8; the wall 6 is provided with circumferential openings 6. The drum heating, the charge feeding and the residue discharging means, which in the following will be described more in detail, are so disposed so as not to interfere with the rotation of the furnace.

In compliance with this aim, the zinc containing materials are charged from a funnel 9 which axially enters the chamber 7 of the furnace, but is not connected with wall 3a. A suitable seal is provided between the furnace wall and the horizontal entrance portion of funnel 9. A transport screw 10 is located in this entrance portion for the continuous feed of the charge.

The heating means and the means for the discharge of the zinc-freed residues as well as of the waste gases are located in the vertical end or lateral wall 3b of chamber 8.

The burner 11 enters chamber 8 in an axial direction; the burner is surrounded by the gas discharge tube 12; the burner, the gas discharge tube and the discharge tube 13 for the zinc-freed residues form one structural unit, which in the customary manner is sealed in the lateral end wall of chamber 8. Circumferential tap openings 14, 14' provided with closure means, not shown, are provided in the vertical lateral walls 3a and 3b for the discharge of the molten zinc. Balls 15, preferably consisting of silicon carbide are provided in the two chambers 7, 8 for the purpose of comminuting lumps, which are often formed during the heat-treatment of the charge.

It is apparent from the above that the treatment of the zinc containing charge may be continuously performed in this furnace, the pretreatment and the finishing treatment being carried out in the two chambers 7, 8. The circumferential tap openings 6', which increase in diameter towards chamber 8, permit the passage of the charge from one into the other chamber.

It is important that the first phase of the treatment is performed in a possibly oxygen-free atmosphere; with this purpose in view the chamber 7 is heated by heat-radiation from chamber 8, Fig. 1.

The heating of chamber 2 may be additionally performed by the gas discharge tube 16, Fig. 2.

Burner 11, which axially enters chamber 8, heats the charge directly, the waste gases pass from chamber 8 into the jet tube 16, which is located in wall 6; they pass through this tube into the gas discharge conduit 12. Whereas the tube 16 is rotated with the furnace, the gas discharge conduit 12 is stationary.

This heating system might well be identified as a counter-current heating system insofar as the direction of the heating gases is opposite to the transport direction of the charge.

The third embodiment of the invention, shown in Fig. 3, differs somewhat from the one illustrated in Fig. 2.

Here the gases leaving the stationary burner 11 enter the pipe 16, which rotates with the furnace; chamber 7 is indirectly heated; the combustion gases leaving pipe 16 heat the chamber 8 directly; the waste gases are discharged through the stationary conduit 12.

The furnace shown in Fig. 1 may be operated, as follows.

The charge is filled into chamber 7 through funnel 9. The furnace is heated to about 700–800° C. and rotated for about fifteen minutes; during this time, the charge is continuously conducted from chamber 7 into chamber 8. The charge is maintained at a height equal to about half the diameter of the furnace. The recovered zinc is removed through the tap openings 14, 14' and the zinc-freed residues and ashes are discharged through tube 13.

If the fresh charge is sufficiently preheated, two or three charges may be treated without preheating the furnace.

The particular characteristics resulting from the operation of the furnace, as shown in Fig. 1, are as follows.

The zinc containing charge is continuously pretreated in chambers 7 and hereupon continuously conducted through openings 6' into the second or finishing chamber 8. The openings 6' increase in size in the transport direction of the charge.

The furnace is heated to a temperature of about 700 to 800° C. The finely divided materials to be freed from zinc are charged through funnel 9 and transported through screw 10 continuously into chamber 7 of the furnace, which is kept in rotation. Chamber 7 is indirectly heated by radiation from the heat-conductive wall layer 5 and the heat conductive separating wall 6 in such a manner that a temperature of preferably above 700° C. is constantly maintained. Under the influence of this temperature, the fine particles of the zinciferous charge are molten and a portion of the zinc is recovered.

The thus partially zinc-freed materials are conducted through the openings 6' into the second chamber 8, which is directly heated.

As a consequence of the continuous rotation, a stratification of the charge results in conformity with its specific weight and in such a manner, that the zinc-freed portion produced in chamber 7 forms the top layer and protects the lower zinc-rich layer against oxidation. The lighter metal-freed portions pass continuously from the upper layer into the discharge conduit 13. Since this discharge conduit is axially located in the drum, the furnace remains filled to about half its height. An interruption of the work is only required after comparatively long intervals and only for the time of the removal of the molten metal through tap openings 14, 14'. The rotational speed of the drum 2 is so controlled that the charge is not taken along by the inner wall layers 4, 5.

In this manner, the generation of dust is reduced and the friction between the charge and the furnace wall and the efficiency of the furnace is accordingly improved.

In order to prevent adherence of the charge to the furnace walls and the formation of lumps heavy grinding balls 15, preferably made of silicon carbide, are provided in the chambers 7, 8. The diameter of the balls is greater than the diameter of the openings 6' in the separating wall 6 in order to prevent the balls from passing from one chamber into the other.

It will be apparent to those skilled in the art that the novel principles of the invention disclosed herein in connection with specific exemplification thereof will suggest various other modifications and applications of the same. It is accordingly desired that in construing the breadth of the appended claims, they shall not be limited to the specific exemplification of the invention described herein.

Having thus described the invention, what I claim as new and desire to be secured by Letters Patent, is as follows:

1. A furnace for the melt-recovery of zinc from intermediary and waste products at a temperature which lies substantially above the melting point of zinc and particularly at a temperature of about 700 to 800° C. comprising a rotatable drum furnace, of which the length is greater than its diameter, lateral end walls to close the furnace, a vertical wall substantially in the center plane of said drum and consisting of a heat conductive refractory material to separate the inner space of the drum into two adjacent chambers, means for feeding the zinc containing products into the first of said two chambers, circumferential openings in said center plane wall for the transport of the charge from the first into the second chamber, a burner and a gas discharge tube located in the lateral end wall of said second chamber to provide a direct heating for said second chamber and an indirect heating for said first chamber.

2. A device for the melt recovery of zinc from intermediary and from waste products at a temperature which lies substantially above the melting point of zinc and particularly at a temperature of about 700 to 800° C. comprising a single rotatable drum body having an equal diameter and being closed at its both ends by vertical walls, said body having an inner lining of a heat conductive material and said end walls being covered by an inner lining of a refractory material, a vertical partition extending substantially through the center plane of said drum and consisting of a heat conductive refractory material separating the inner drum space into two chambers, means for feeding the zinc containing materials into the first and indirectly heated chamber for a heat-pretreatment of the zinc containing charge, circumferential openings in said center partition for the transport of the pretreated zinc-containing charge from the first into the second chamber, a burner in the end wall of said second chamber for the completion of the zinc removal and a gas discharge tube in said wall, circumferential openings in said two end walls for the removal of the zinc and a center opening in the end wall of said second chamber for the discharge of the zinc-freed residues.

References Cited in the file of this patent

UNITED STATES PATENTS

| Number | Name | Date |
|---|---|---|
| 611,110 | Duryee | Sept. 20, 1898 |
| 1,435,930 | Laury | Nov. 21, 1922 |
| 1,561,070 | Fujiyama | Nov. 10, 1925 |
| 1,802,196 | Cheesman | Apr. 21, 1931 |
| 2,039,645 | Hechenbleikner | May 5, 1936 |
| 2,229,383 | Lohse | Jan. 21, 1941 |
| 2,261,895 | Zippler, Jr. | Nov. 4, 1941 |

FOREIGN PATENTS

| Number | Country | Date |
|---|---|---|
| 110,010 | Australia | Mar. 5, 1940 |